(Model.) 4 Sheets—Sheet 1.

J. W. H. DOUBLER.
MAP HOLDER.

No. 292,902. Patented Feb. 5, 1884.

Witnesses:
Albert H. Adams
O. W. Bond

Inventor:
John W. H. Doubler
By West & Bond Attys (Model.)
4 Sheets—Sheet 2.
J. W. H. DOUBLER.
MAP HOLDER.
No. 292,902.
Patented Feb. 5, 1884.
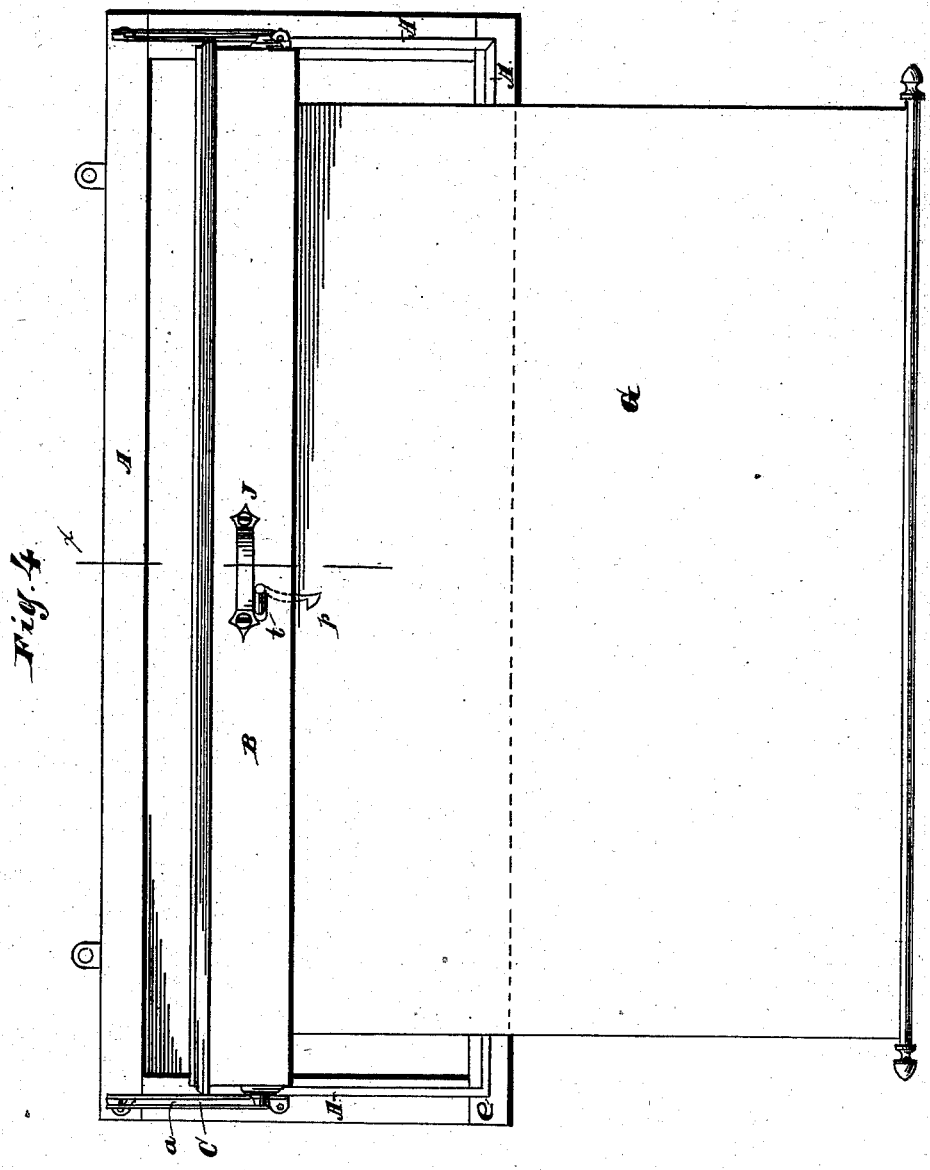

(Model.) 4 Sheets—Sheet 3.
J. W. H. DOUBLER.
MAP HOLDER.
No. 292,902. Patented Feb. 5, 1884.
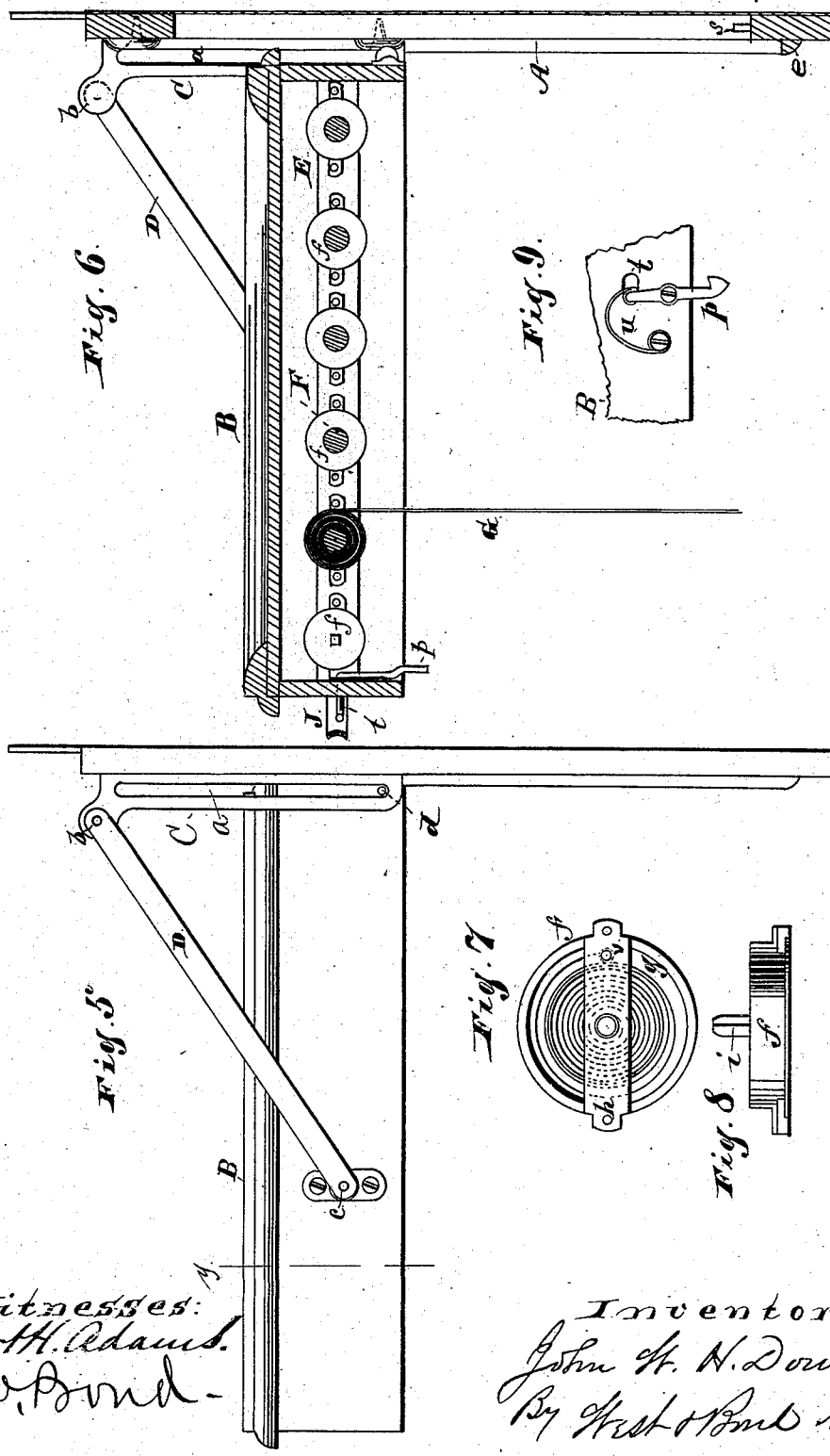
Witnesses:
Albert H. Adams.
O. W. Bond.
Inventor:
John W. H. Doubler
By West & Bond Attys (Model.)
4 Sheets—Sheet 4.
J. W. H. DOUBLER.
MAP HOLDER.
No. 292,902.
Patented Feb. 5, 1884.
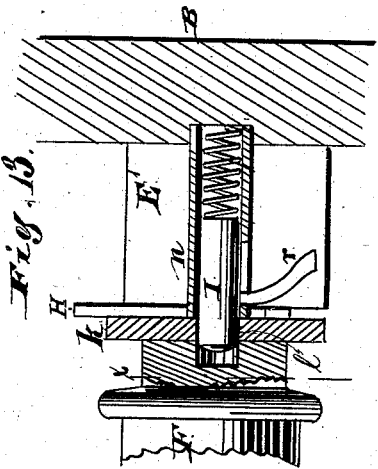
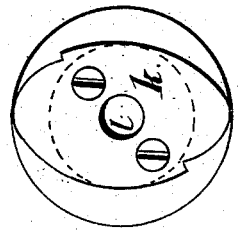
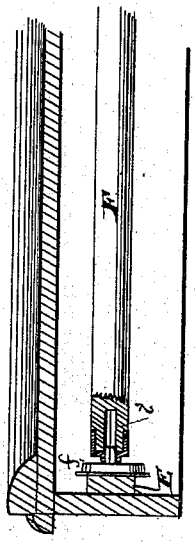
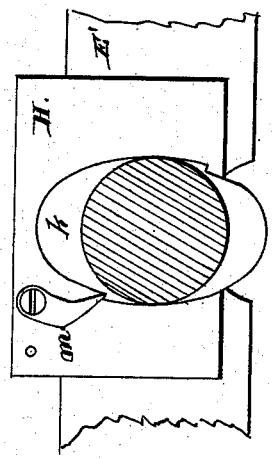
Witnesses:
Albert H. Adams
O. W. Bond
Inventor:
John W. H. Doubler
By West & Bond Attys.
N. PETERS, Photo-Lithographer, Washington, D. C.

UNITED STATES PATENT OFFICE.

JOHN W. H. DOUBLER, OF ROCKFORD, ASSIGNOR TO A. H. ANDREWS & CO., OF CHICAGO, ILLINOIS.

MAP-HOLDER.

SPECIFICATION forming part of Letters Patent No. 292,902, dated February 5, 1884.

Application filed April 24, 1882. (Model.)

*To all whom it may concern:*

Be it known that I, JOHN W. H. DOUBLER, residing at Rockford, in the county of Winnebago and State of Illinois, and a citizen of the United States, have invented new and useful Improvements in Map Racks or Holders, of which the following is a full description, reference being had to the accompanying drawings, in which—

Figure 2:
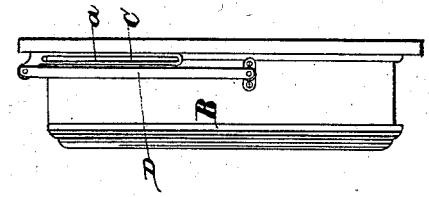
Figure 1:
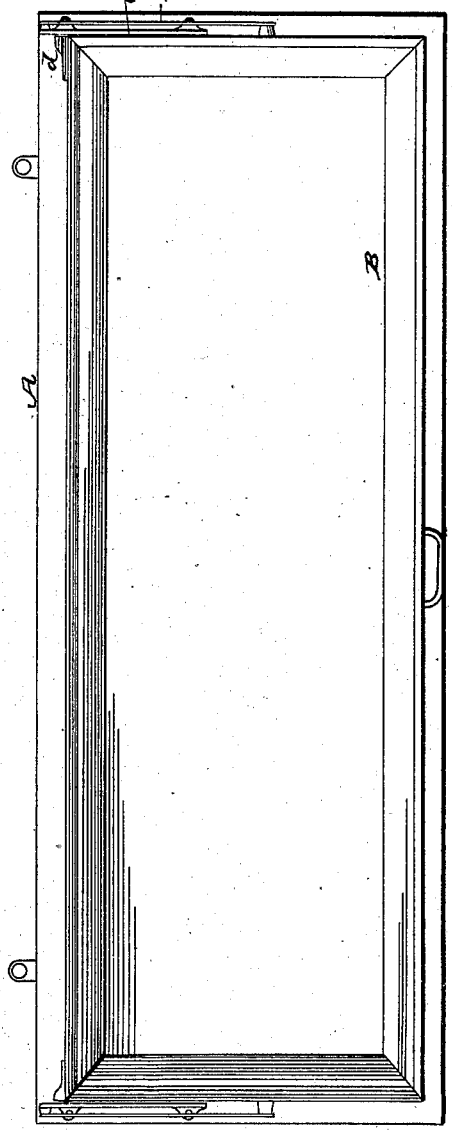
Figure 3:
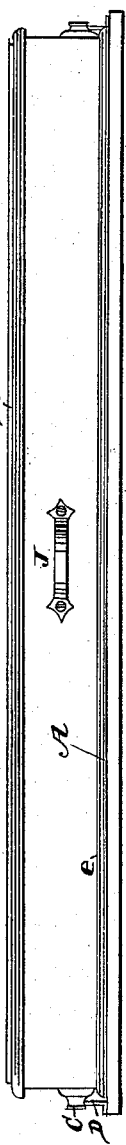

Figure 1 is a front elevation, the map-holder being closed. Fig. 2 is an end view of the same. Fig. 3 is a bottom view of the same. Fig. 4 is a front view, showing the map-holder open and a map in view. Fig. 5 is an end view, showing the map-holder open. Fig. 6 is a section at line $x$ of Fig. 4. Figs. 7 and 8 are details showing the spring and its case. Fig. 9 is a detail showing the catch which keeps the map-holder closed. Fig. 10 is a longitudinal section at line $y$ of Fig. 5. Fig. 11 is a detail, being a section at line $x$ of Fig. 13, looking to the right. Fig. 12 is a detail showing one end of a roller with the eccentric cam-plate attached. Fig. 13 is a detail, the parts shown being mostly in section. Figs. 5 to 13, inclusive, are enlarged.

The object of this invention is to construct an improved map-holder, mainly for office and school use, adapted to be hung upon a wall, if desired, and which can be closed when desired to protect the maps from dust; and it consists in the novel construction and arrangement of parts hereinafter described, and then pointed out in the claims.

In the drawings, A represents the two side and two end pieces of a rectangular frame, which, as shown, is about five and a half feet long and two feet wide. It may be made from strips about an inch thick, and the back may be covered with cloth or wood or other suitable material.

B is a frame or case, open on the back or under side only, adapted to receive and hold a number of map-rollers.

C are irons secured to the ends and on the face of the frame A, as shown, which irons each have a long vertical slot, $a$.

D are two bars, preferably of iron, one at each end of the frame or case B. One end of each iron D is pivoted to the upper end of one of the irons C at $b$, and the other end of each iron or bar D is pivoted to the outside of the end of the case B at a point, $c$, forward of or below the center.

To each upper rear corner of the frame B, (referring now to Figs. 1 and 2) is secured an iron, $d$, which projects from such frame, the projecting portion entering one of the slots $a$ in the iron C, such portion being preferably round.

$e$ is a molding on the frame A.

E E' are strips of wood on the inside of the case B, one at each end. $f$ are cases, each of which carries a spring, $g$, similar to a clock-spring. On the back side of each case $f$ is a bar, $h$.

$i$ is a rotating pin having one bearing in the bar $h$ and the other in the face of the case $f$. One end of this pin projects beyond the case $f$, and is square or angular. (See Fig. 8.)

F are a number of rollers, each designed to carry one map, G. One end of each roller is provided with a suitable socket, designed to receive the projecting part of the pin $i$, as shown in Fig. 10. Upon the other end of each roller is secured a notched eccentric plate, $k$, having a hole, $l$, at the center.

H is a plate secured to the inside of the strip E', one for each roller.

$m$ is a pawl pivoted one to each plate H, and adapted to engage automatically with the notches in the plates $k$.

I is a spring-bolt, one for each roller. As shown, the bolt is in a metal case, $n$, inserted in E, and the bolt has a projecting stem, $r$, to be used in retracting the bolt. (See Fig. 13.)

$p$ is a catch, pivoted upon the inside of the front (looking at Fig. 6) of the case B, which catch engages with a pin, $s$, on A. The catch has a stem, $t$, projecting through the case B, for manipulating the catch, and it is held engaged with the pin $s$ by a spring, $u$.

One end of the flat spring $g$ in the case $f$ is secured to the rotating pin $i$. The other end of such spring is to be secured to a pin, $v$, (see Fig. 7,) or to some other suitable part. In Fig. 6 one roller is removed to show the face of the case $f$, and only one map is shown. The cases $f$ are secured to the inside of the strip E. Each roller may have a hole or socket in the end next to the bolt I, to receive such bolt, as shown in Figs. 10 and 13. Each roller with its map can be placed in the case or holder B by first putting one end upon the projecting part of the pin $i$; then, if the bolt I be retracted, the other end of the roller can be brought into such a position that the hole $l$ will be opposite the bolt; then, if the bolt be released, it will enter the hole $l$ in the plate $k$, and the roller will be ready for use. I make the extreme length of each roller, including the irons on the ends, such that the roller and irons thereon will just fill the space between the face of the case $f$ and the plate H; hence there will be no lateral movement of the roller, and it cannot be displaced or removed, except by retracting the spring-bolt I.

The notched eccentric plate $k$ and pawl $m$ together form an improved device for holding a map at any desired position. When the roller is moving rapidly, the pawl will not drop into the notches, but it will drop into them when the movement is slow. Each roller, after it has been placed in position, is to be rotated in the proper direction sufficiently to produce suitable tension of the spring $g$.

The case or map-holder B is hinged to the frame A, as described, which frame A is to be secured for use to a wall or other suitable place. When the case B is closed, as shown in Figs. 1 and 2, the maps will all be in the closed case, well protected from dust. When in such position, the case can be easily opened or brought into the position shown in Figs. 4 and 5, by lifting the lower edge, which may be provided with a handle, J; and as the case B is pivoted to the bars D, upon lifting the lower edge the upper edge will gradually descend, the irons D passing down in the slots $a$ in the irons C; and when the irons $d$ reach the lower ends of these slots the case B will be in a horizontal position, as shown in Figs. 4 and 5, in which position any one of the maps can be brought into view, as shown in Fig. 4, and will be held in place by the pawl $m$ and plate $k$. The action of the spring $g$ will return the map into the case if the map be first pulled down a little to release the pawl.

By hinging and connecting the case B, as described, it can be easily manipulated, it being nearly balanced on the pivotal points $c$; but as these points are forward of the center, (looking at Fig. 5,) the case will be held in the position shown in this figure by the weight of the rear part; and by pressing or pulling down on the front the case can be easily closed, the front going down, the rear rising, the case swinging on the pivots at $c$. This manner of hinging and supporting the case B is a desirable feature, and dispenses with all other devices for holding the same open. The metal at lower ends of the slots $a$ serves the purpose of stops to limit the downward movement of the rear of the case.

It is not necessary to use spring-bolts I. Bolts which must be moved in both directions by hand could be substituted; but, as the roller rotates on this bolt, its projecting end should be round.

What I claim as new, and desire to secure by Letters Patent, is as follows:

1. In a map-holder, a swinging case, B, open on one side only, adapted to receive and hold a series of maps, and supported by hinged bars D, pivoted at one end to the ends of the case a little forward of the center of gravity, substantially as and for the purposes specified.

2. In a map-holder, a case, B, adapted to receive and hold a series of maps, and provided with projecting irons $d$, in combination with irons C, provided with a slot, $a$, and bars D, pivoted at one end to the irons C, and at the other end to the ends of the case B a little forward of the center of gravity, substantially as and for the purposes set forth.

JOHN W. H. DOUBLER.

Witnesses:
MARCUS S. PARMELE,
JAMES T. JOSLIN.